United States Patent
Diab

(10) Patent No.: US 7,890,777 B2
(45) Date of Patent: Feb. 15, 2011

(54) SYSTEM AND METHOD FOR COLLECTING POWER MANAGEMENT PARAMETERS IN A COMPUTING DEVICE FOR POWER OVER ETHERNET

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 921 days.

(21) Appl. No.: 11/744,933

(22) Filed: May 7, 2007

(65) Prior Publication Data

US 2008/0256373 A1    Oct. 16, 2008

Related U.S. Application Data

(60) Provisional application No. 60/911,122, filed on Apr. 11, 2007.

(51) Int. Cl.
*G06F 1/00* (2006.01)
(52) U.S. Cl. .................... 713/300; 713/320; 709/205
(58) Field of Classification Search ............ 713/300, 713/320; 709/205
See application file for complete search history.

(56) References Cited

U.S. PATENT DOCUMENTS

| | | | |
|---|---|---|---|
| 6,446,213 B1 | 9/2002 | Yamaki | |
| 7,240,224 B1 | 7/2007 | Biederman | |
| 7,363,525 B2 * | 4/2008 | Biederman et al. | 713/340 |
| 7,454,641 B2 * | 11/2008 | Connor et al. | 713/324 |
| 7,603,570 B2 * | 10/2009 | Schindler et al. | 713/300 |
| 2003/0099076 A1 * | 5/2003 | Elkayam et al. | 361/90 |
| 2006/0126464 A1 | 6/2006 | Tomoaki et al. | |
| 2006/0280195 A1 * | 12/2006 | Lopez et al. | 370/419 |
| 2007/0041387 A1 * | 2/2007 | Ghoshal et al. | 370/395.52 |
| 2007/0079151 A1 * | 4/2007 | Connor et al. | 713/300 |
| 2007/0110360 A1 * | 5/2007 | Stanford | 385/14 |
| 2007/0124608 A1 | 5/2007 | Knowlson et al. | |
| 2007/0135086 A1 * | 6/2007 | Stanford | 455/402 |
| 2008/0005433 A1 * | 1/2008 | Diab et al. | 710/106 |
| 2008/0005599 A1 * | 1/2008 | Theocharous et al. | 713/300 |
| 2008/0005600 A1 * | 1/2008 | Diab et al. | 713/300 |
| 2008/0005601 A1 * | 1/2008 | Diab | 713/300 |
| 2008/0016263 A1 * | 1/2008 | Diab et al. | 710/105 |
| 2008/0175260 A1 * | 7/2008 | Hussain et al. | 370/419 |

\* cited by examiner

*Primary Examiner*—Thomas Lee
*Assistant Examiner*—Jaweed A Abbaszadeh
(74) *Attorney, Agent, or Firm*—Duane S. Kobayashi

(57) ABSTRACT

A system and method for collecting power management parameters in a computing device for power over Ethernet (PoE). Computing devices such as portable computers can include a collection component that is responsible for gathering power management information from various parts of the computing device. The collected power management information can then be sent to a LAN on motherboard device for use in a PoE allocation scheme.

20 Claims, 5 Drawing Sheets

SYSTEM AND METHOD FOR COLLECTING POWER MANAGEMENT PARAMETERS IN A COMPUTING DEVICE FOR POWER OVER ETHERNET

This application claims priority to provisional application No. 60/911,122, filed Apr. 11, 2007, which is incorporated by reference herein, in its entirety, for all purposes.

BACKGROUND

1. Field of the Invention

The present invention relates generally to Power over Ethernet (PoE) and, more particularly, to a system and method for collecting power management parameters in a computing device for PoE.

2. Introduction

The IEEE 802.3af and 802.3at PoE specifications provide a framework for delivery of power from power sourcing equipment (PSE) to a powered device (PD) over Ethernet cabling. In this PoE process, a valid device detection is first performed. This detection process identifies whether or not it is connected to a valid device to ensure that power is not applied to non-PoE capable devices. After a valid PD is discovered, the PSE can optionally perform a power classification. The completion of this power classification process enables the PSE to manage the power that is delivered to the various PDs connected to the PSE.

Managing PDs such as VoIP phones, wireless LAN access points, Bluetooth access points, and network cameras is one of the tasks of the PSE. In general, a PSE is designed to provide stable output power to a PD. One example of such a PD is a portable computing device (e.g., laptop computer), which can have varying power requirements depending on the operation of its internal components. These internal components need not be uniform and can vary greatly between devices depending on the manufacturer and component suppliers. Moreover, power usage can be highly dependent on the application(s) running on the portable computing device. In one operating state, the portable computing device can be in a relatively idle state or performing simple tasks such as word processing. In another operating state, the portable computing device can be performing a variety of simultaneous tasks such as video encoding, disc burning, game playing, and even powering other USB devices. As would be appreciated, transitions between the various operating states can be rapid and continual as the usage requirements of the portable computing device change in accordance with the directives of the user. What is needed therefore is a mechanism for collecting various power management parameters for use in managing such PDs in a PoE system.

SUMMARY

A system and/or method for collecting power management parameters in a computing device for PoE, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
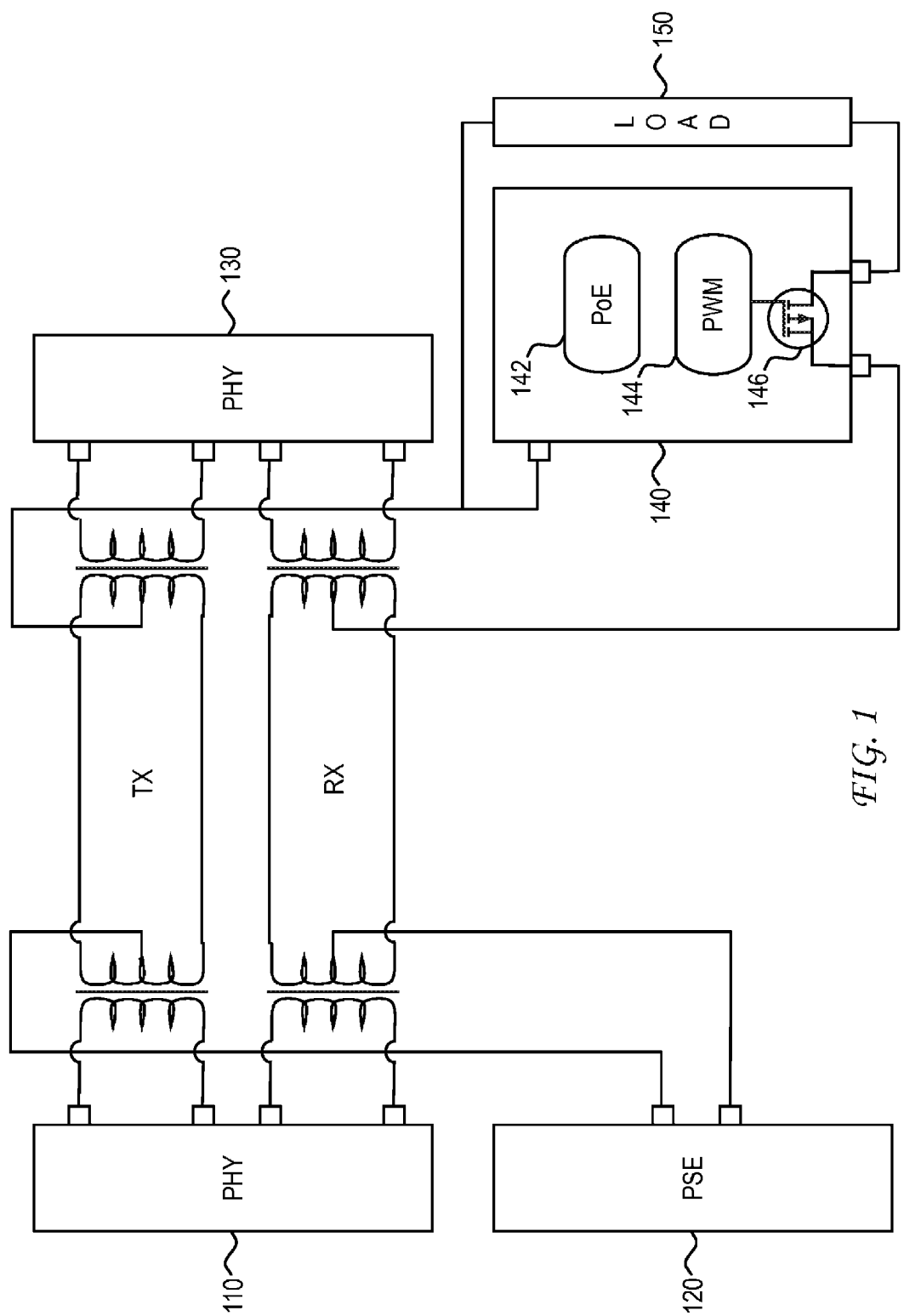
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other portable or remotely provisioned device. This computing device can have highly varying power requirements depending on the existence and state of operation of various internal or externally supported components. These components need not be uniform and can vary greatly between devices depending on the manufacturer and component suppliers. Moreover, power usage can be highly dependent on the application(s) running on the computing device. In one operating state, the computing device can be in relatively idle state or performing simple tasks such as word processing. In another operating state, the computing device can be performing a variety of simultaneous tasks such as video encoding, disc burning, game playing, and even powering other USB devices. In general, transitions between operating states such as those exemplified above, can be rapid and continual as the usage requirements of the computing device change in accordance with the directives of the computing device user.

Computing devices that are connected to enterprise networks are typically connected on a non-permanent basis. Consider, for example, a corporate conference room that has multiple Ethernet ports for conference participants. In this conference room context, the switch box typically includes 5-20 ports for the entire conference room. In typical conference room usage scenarios, the limited PSE power supply would often be oversubscribed. This results since each computing device may require 13 W to hold the battery level at a steady state under a typical usage scenario, and greater than 20 W for charging of the battery in the portable computing device. In combination, the PSE only has enough power to support a subset of the portable computing devices, each of which is attempting to extract as much power from the PSE as possible. Allocation of power to the various connected computing devices is therefore a key concern for the PoE system.

In a conventional 802.3af allocation, each PD would initially be assigned a 15.4 W power classification after a Layer 1 discovery process. An optional classification process could then reclassify the PD to a lower power level. This conventional classification process is limited by its inability to accurately model the PD's power demand.

In accordance with the present invention, a priority and allocation determination scheme for PoE is enabled by collecting power management information from the computing device. Prior to describing the power management information collection process, a brief description is first provided of an example embodiment of a computing device.

Figure 2:
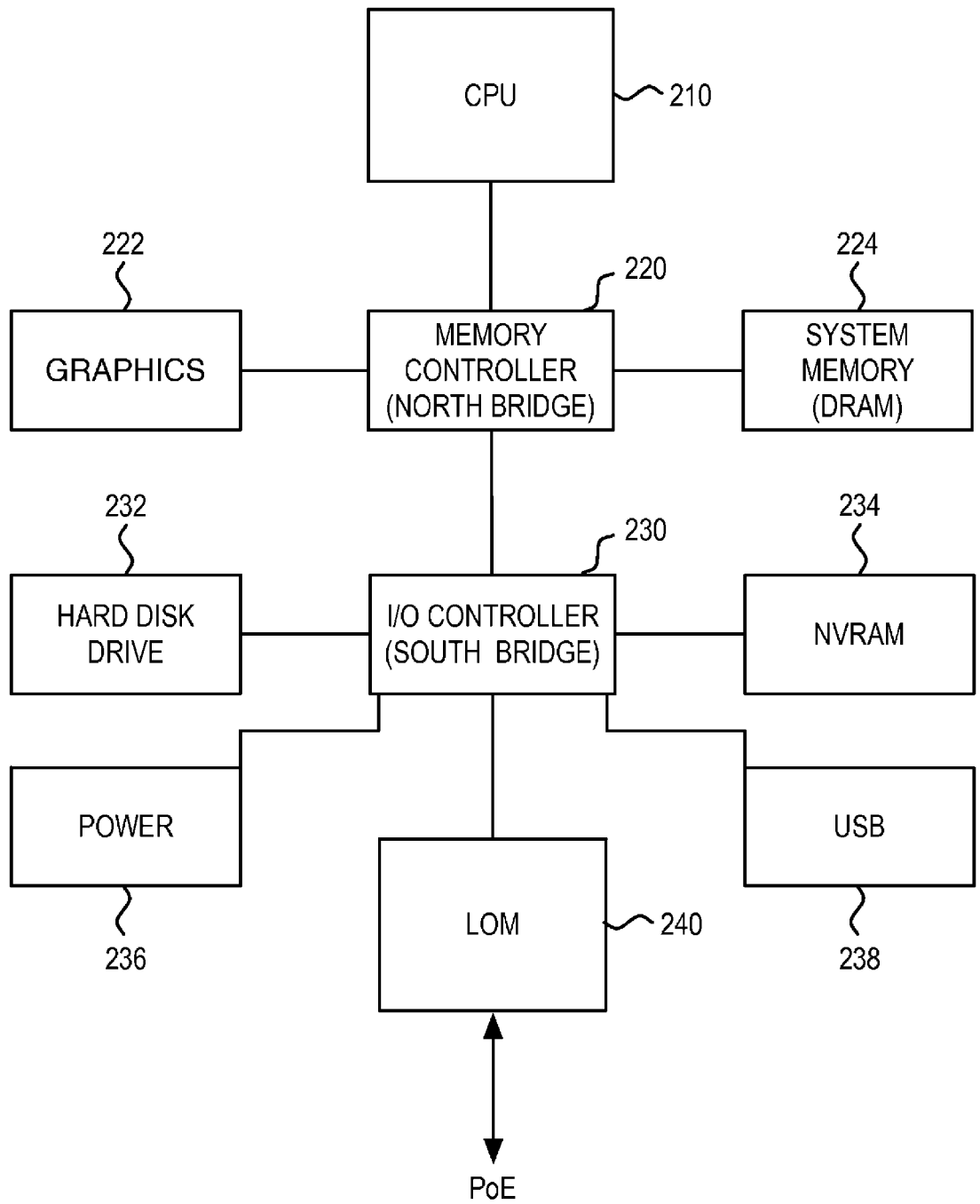
FIG. 2 illustrates an embodiment of a computing device.

In the illustration of FIG. 2, the computing device includes conventional computing components such as CPU 210, memory controller (north bridge) 220, and I/O controller (south bridge) 230. As illustrated, memory controller 220 can be coupled to graphics subsystem 222 and main system memory 224. I/O controller 230, on the other hand, can also be coupled to various components, including hard disk drive 232, nonvolatile RAM (NVRAM) 234, power subsystem 236 and USB controller 238. As would be appreciated, the example embodiment of FIG. 2 is not intended to be exhaustive or limiting. Various other memory controller and I/O controller configurations can be used with the principles of the present invention.

As FIG. 2 further illustrates, I/O controller is also in communication with LAN on motherboard (LoM) 240. In general, LoM 240 provides networking functionality onto the motherboard, thereby eliminating the need for an add-in network interface card (NIC). In one embodiment, LoM 240 includes a fully integrated 10/100/1000BASE-T Gigabit Ethernet media access controller (MAC), PCI Express bus interface, on-chip buffer memory, and integrated physical layer (PHY) transceiver in a single-chip solution. In other embodiments, LoM 240 can also include a wireless communication component.

In this environment, it is a feature of the present invention that power management information that is collected by a collection component can be provided to LoM 240 for use in PoE management. In various examples, power management information can include one or more of the following: battery information (e.g., battery capacity, battery life, etc.); CPU status information (e.g., running, idle, etc.); CPU performance information (e.g., supply voltage, processor frequency, etc.); device state information for devices such as a hard drive, DVD drive, USB device, etc.; system information (e.g., active, sleeping, etc.); application load information; user priority levels; or any other information that would be relevant to power management.

In one embodiment, the power management information provided to LoM 240 by the collection component is forwarded by LoM 240 to a switch using Layer 2 packets. The switch would then use the forwarded power management information in a power management algorithm to determine a power level and priority of a request attributable to the computing device. More specifically, the switch can make a priority decision based on a priority and allocation algorithm to determine whether to grant or deny the entire request or grant a lower power level. In this embodiment, LoM 240 would generally function as a transport mechanism in routing power management information from the collection component to the switch. In another embodiment, the LoM 240 or another component on the computing device would process the received power management information to determine a power level and priority for a request that is then sent to the switch. If a component apart from LoM 240 processes the received power management information, then LoM 240 would again function generally as a transport mechanism. In one embodiment, processed results and the collected power management information can both be sent to the switch for further power management processing.

Figure 3:
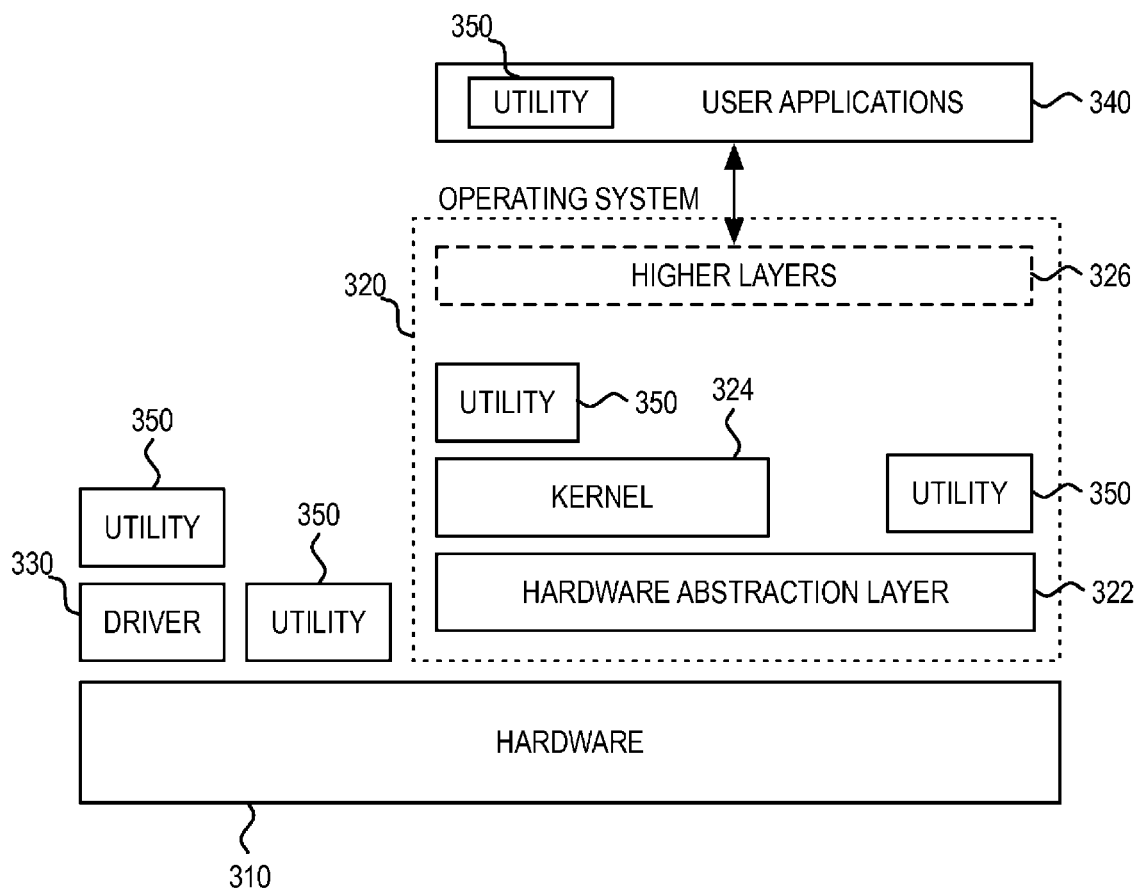
FIG. 3 illustrates an embodiment of a software architecture in a computing device.

In one embodiment, the collection component in the computing device is implemented in software. FIG. 3 illustrates one example of a computing device software architecture in which the collection component can be implemented. As illustrated, the software architecture sits atop hardware 310. Hardware 310 contains a CPU or other processing device. Residing on top of hardware 310 is operating system (OS) 320. An OS such, as Windows, Mac OS X, UNIX, etc. can have various components that enable user applications 340 to run on hardware 310. In the example illustration of FIG. 3, OS 320 includes such components as hardware abstraction layer (HAL) 322, which provides a low-level interface with hardware 310; kernel 324, which sits on top of HAL 322; and higher layers 326. As would be appreciated, the particular components included within OS 320 would be implementation dependent. In general, OS components and third-party device drivers can communicate with hardware 310 through HAL 322. In one embodiment, collection component utility 350 resides within the various layers of the OS. For example, collection component utility 350 can reside on top of kernel 324 or on top of HAL 322.

In another embodiment, collection component utility 350 is embodied as a low-level driver that interacts directly with hardware 310. In yet another embodiment, collection component utility 350 resides in a manager component that interacts with low-level driver 330.

As further illustrated in the software architecture of FIG. 3, user applications 340, which can include collection component utility 350, can also interact with hardware 310. The interaction between user applications 380 and hardware 310 is facilitated by higher layers 326. As would be appreciated, the specific makeup of higher layers 326 would be dependent on implementation details of the OS. In an additional embodiment, the collection component can reside in user application 380.

Figure 4:
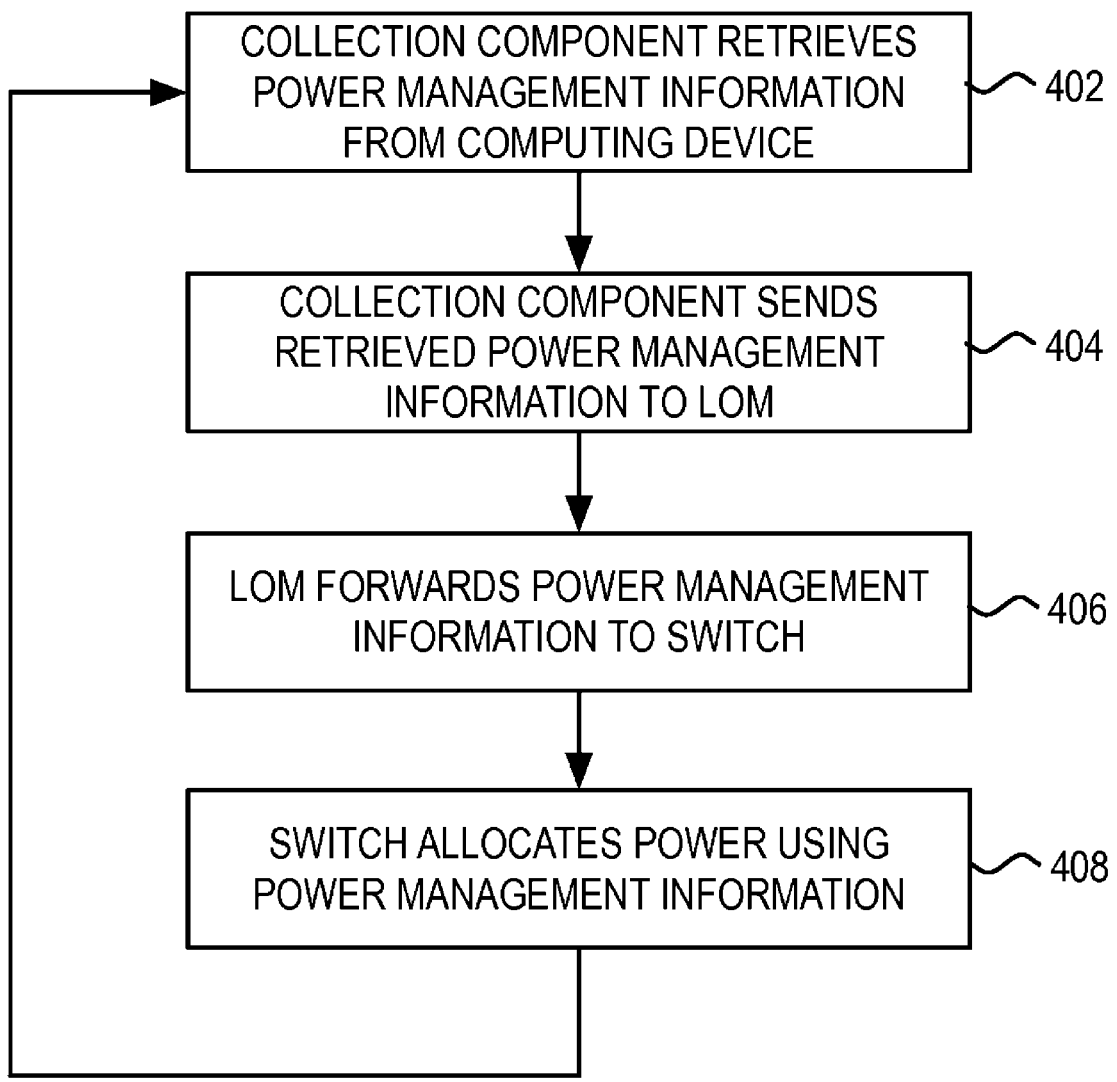
FIG. 4 illustrates a flowchart of a dynamic PoE allocation scheme.

As has been described, the collection component of the present invention can reside at various levels of the software architecture. In general, the specific implementation of the software collection component would be dependent on the goals of the computing device manufacturer or OS manufacturer. In various scenarios, the collection utility may be part of the software suite that the original equipment manufacturer (OEM) making the computing device provides, may come from the OS manufacturer, or from a third party. Regardless, the collection of power management information by a collection component utility enables a dynamic power allocation PoE scheme as it does not rely on semi-static information. FIG. 4 illustrates an embodiment of the dynamic power allocation PoE scheme.

As illustrated, the process begins at step 402 where the software collection component retrieves power management information from the computing device. The initial activation of the software collection component can occur upon connection of the computing device to a PSE. In various embodiments, the collection process can occur prior to, along with, or subsequent to the detection or classification of the computing device as a PD.

The specific power management information that is collected by the collection component would be implementation dependent. In various examples, the power management information can include battery information, computing device component information, external device information, user information, or the like. The collection component can therefore be responsible for gather power management information from various parts of the computing device.

At step 404, the collection of power management information is sent to the LoM. In turn, the LoM forwards the power management information to the switch at step 406. In this embodiment, the LoM can be operable to simply receive a datagram from the collection component and route the datagram to the address of the switch. In other words, the LoM need not have any intelligence regarding the allocation scheme that is being implemented by the PoE system.

At step 408, upon receipt of the power management information, the switch can then allocate power to the computing device based on an algorithm that determines a power level and priority of a request attributable to the computing device. In this switch-centric design, the switch would be responsible for processing the raw power management information.

Figure 5:
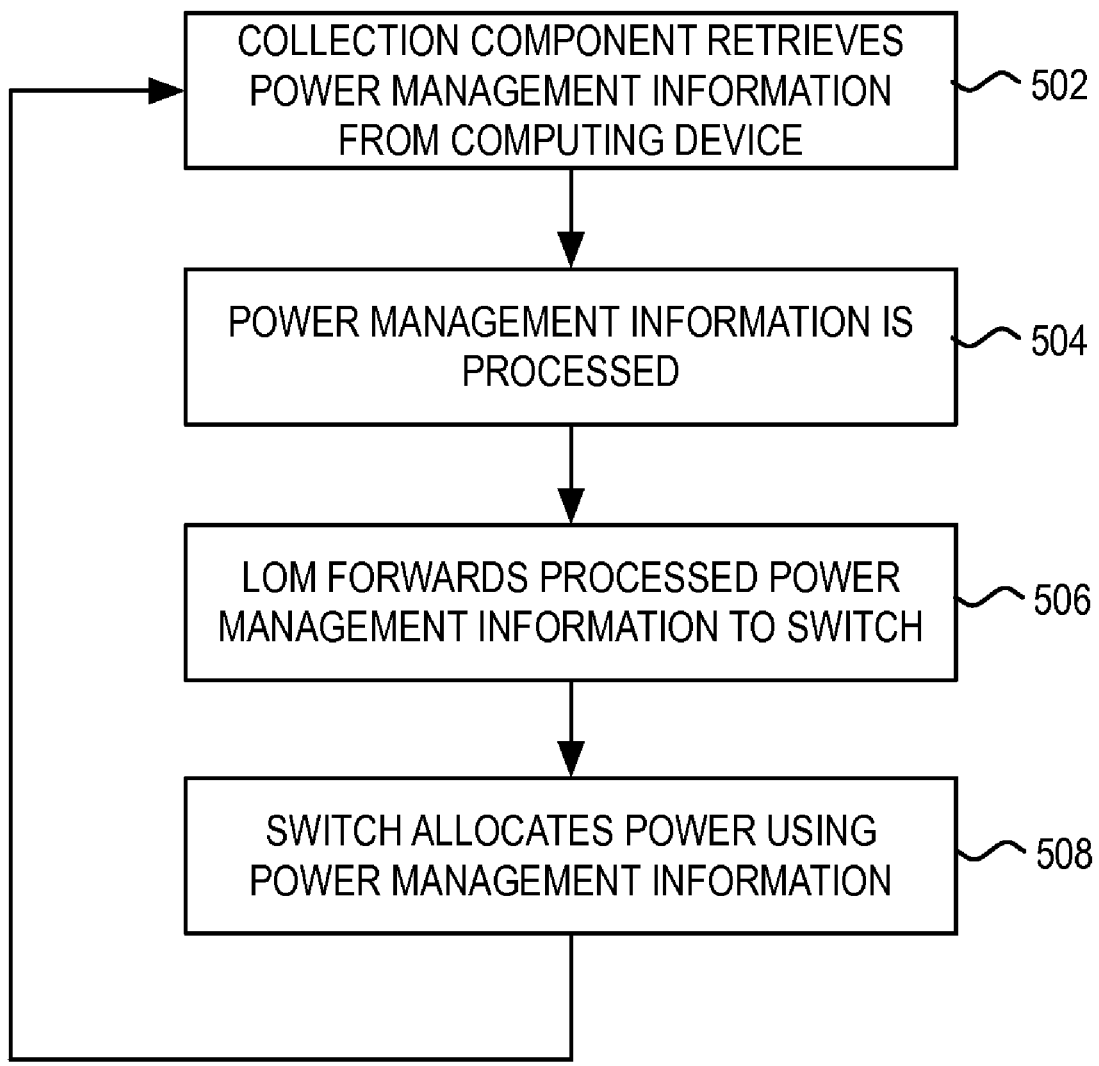
FIG. 5 illustrates a flowchart of an alternative dynamic PoE allocation scheme.

FIG. 5 illustrates an alternative embodiment of the dynamic power allocation PoE scheme, wherein the collected power management information is processed in the computing device. As illustrated, the process begins at step 502 where the software collection component retrieves power management information from the computing device. Like the process of FIG. 4, the collection process can occur prior to, along with, or subsequent to the detection or classification of the computing device as a PD.

At step 404, the collected power management information is processed by the computing device using an algorithm that determines a power level and priority of a request attributable to the computing device. In one embodiment, the collected power management information is processed by the collection component. This collection component can be embodied in various levels of the software architecture, in hardware, or a combination of both. In an alternative embodiment, the collected power management information is processed by the LoM. Regardless of where the power management information is processed in the computing device, the LoM would then forward the processed results to the switch at step 506. In one embodiment, the collected power management information is also forwarded along with the processed results Finally, at step 508, upon receipt of the processed results and possibly the collected power management information, the switch can then allocate power to the computing device based on a priority and allocation algorithm.

In general, regardless of the component that is given the responsibility for processing the raw power management information, the use of a collection component enables a dynamic power allocation scheme. As illustrated in FIGS. 4 and 5, after power has been allocated to the computing device, the process loops back for further power management information collection by the collection component. This loop in the process represents the dynamic nature of having one or more power management parameters change in ways that cannot be modeled. For example, unlike battery drainage under a predicted load, the user of the computing device could unexpectedly place the computing device in a hibernate mode. This change in power requirement could significantly change the current power needs of the computing device. In one embodiment, a change in a power management parameter can be identified based on some form of polling mechanism built into the collection component. In another embodiment, a change in a power management parameter can be identified based on an interrupt or other messaging mechanism that alerts the collection component to the change.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method in a computing device having a processing unit, memory and a LAN on motherboard device, comprising:

retrieving, by a software collection application supported by a software operating system executed by said processing unit, power management information for said computing device, said power management information including application load information for one or more software applications being executed by said processing unit;

forwarding, via an input/output controller coupled to said LAN on motherboard device, said power management information retrieved by said software collection component to said LAN on motherboard device on said computing device; and transmitting said power management information from said LAN on motherboard device to a switch via a network cable, thereby enabling said switch to manage power provided to said computing device via said network cable based on an analysis of power usage of said computing device as indicated at least in part by said application load information included in said transmitted power management information.

2. The method of claim 1, wherein said retrieving is based on instructions contained in a read only memory.

3. The method of claim 1, further comprising encapsulating said power management information in Layer 2 packets.

4. A power over Ethernet computing device, comprising:
a central processing unit;
a computer readable program product having instructions that, when executed by said central processing unit, are operative to retrieve power management information relating to application load information for one or more software applications being executed by said central processing unit, said instructions being included in a software collection application supported by a software operating system executed by said central processing unit; and a LAN on motherboard module that encapsulates said retrieved power management information into layer 2 packets for delivery to a switch for use in a control of power delivered to the computing device.

5. The method of claim 4, wherein said computer readable program product is a hard drive.

6. The method of claim 4, wherein said computer readable program product is a read only memory.

7. The method of claim 4, wherein the computing device is a portable computing device.

8. The power over Ethernet computing device of claim 4, wherein said instructions are part of a software application that is supported by software operating system run by said central processing unit.

9. The power over Ethernet computing device of claim 4, wherein said instructions are included in a software operating system run by said central processing unit.

10. The power over Ethernet computing device of claim 4, further comprising an input/output controller coupled to said LAN on motherboard module, said input/output controller forwarding said retrieved power management information to said LAN on motherboard module.

11. A power over Ethernet method in a computing device having a central processing unit, memory and a LAN on motherboard device, comprising:

executing instructions on said central processing unit in said computing device, said executed instructions included in a software collection application supported by a software operating system executed by said central processing unit, said software collection application being operative to retrieve power management information relating to said computing device;

forwarding, via an input/output controller coupled to said LAN on motherboard device, information based on said retrieved power management information to said LAN on motherboard device on said computing device; and transmitting information based on said power management information from said LAN on motherboard device to a switch via a network cable, thereby enabling said switch to manage power provided to said computing device via said network cable based on an analysis of power usage of said computing device as indicated at least in part by said power management information.

12. The method of claim 11, wherein said retrieved power management information includes battery information.

13. The method of claim 11, wherein said retrieved power management information includes processor status information.

14. The method of claim 11, wherein said retrieved power management information includes processor performance information.

15. The method of claim 11, wherein said retrieved power management information includes device state information.

16. The method of claim 11, wherein said retrieved power management information includes application load information.

17. The method of claim 11, wherein said retrieved power management information includes user priority level information.

18. The method of claim 11, further comprising processing said retrieved power management information using a power management algorithm in said computing device.

19. The method of claim 18, wherein said processing comprises processing said retrieved power management information in a software component, and wherein said sending comprises sending said processed power management information.

20. The method of claim 18, wherein said processing comprises processing said retrieved power management information in said LAN on motherboard device, and wherein said transmitting comprises transmitting said processed power management information.

* * * * *